May 23, 1933. W. H. NICKERSON 1,911,034
MOTION PICTURE CAMERA
Filed July 11, 1930  2 Sheets-Sheet 1
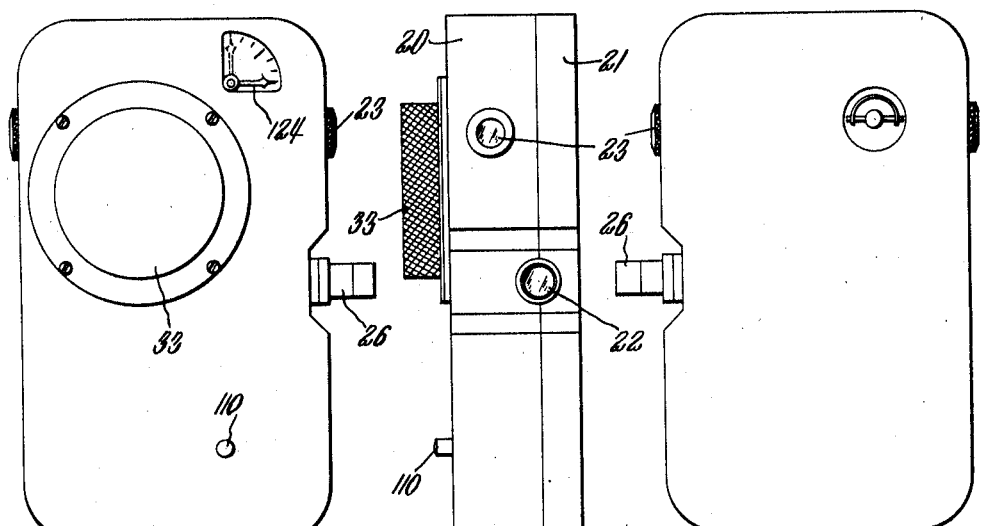
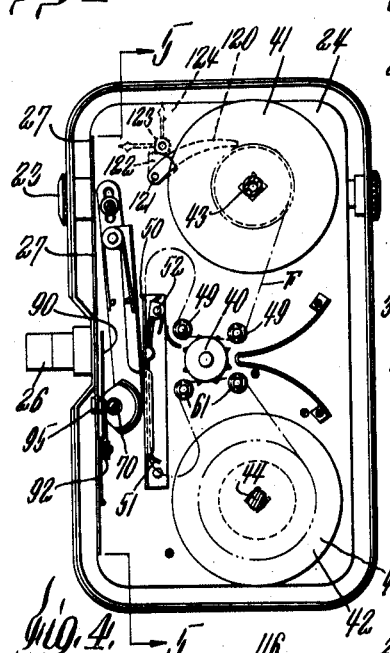
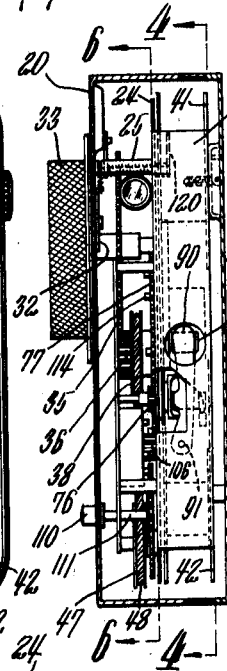
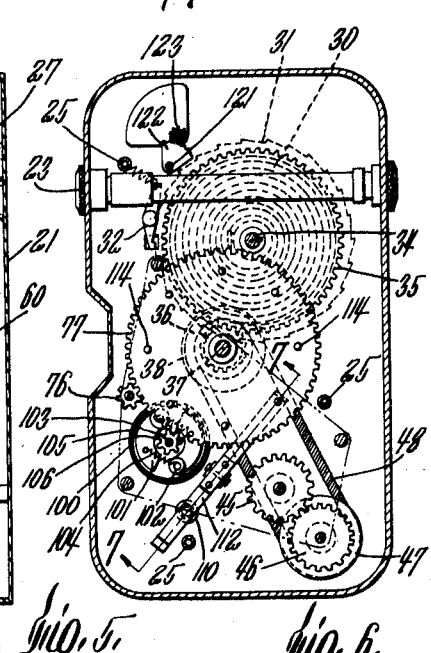
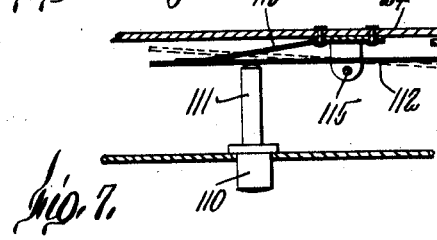
Inventor
William H. Nickerson
by Wright Brown Quinby & Macy
Attys

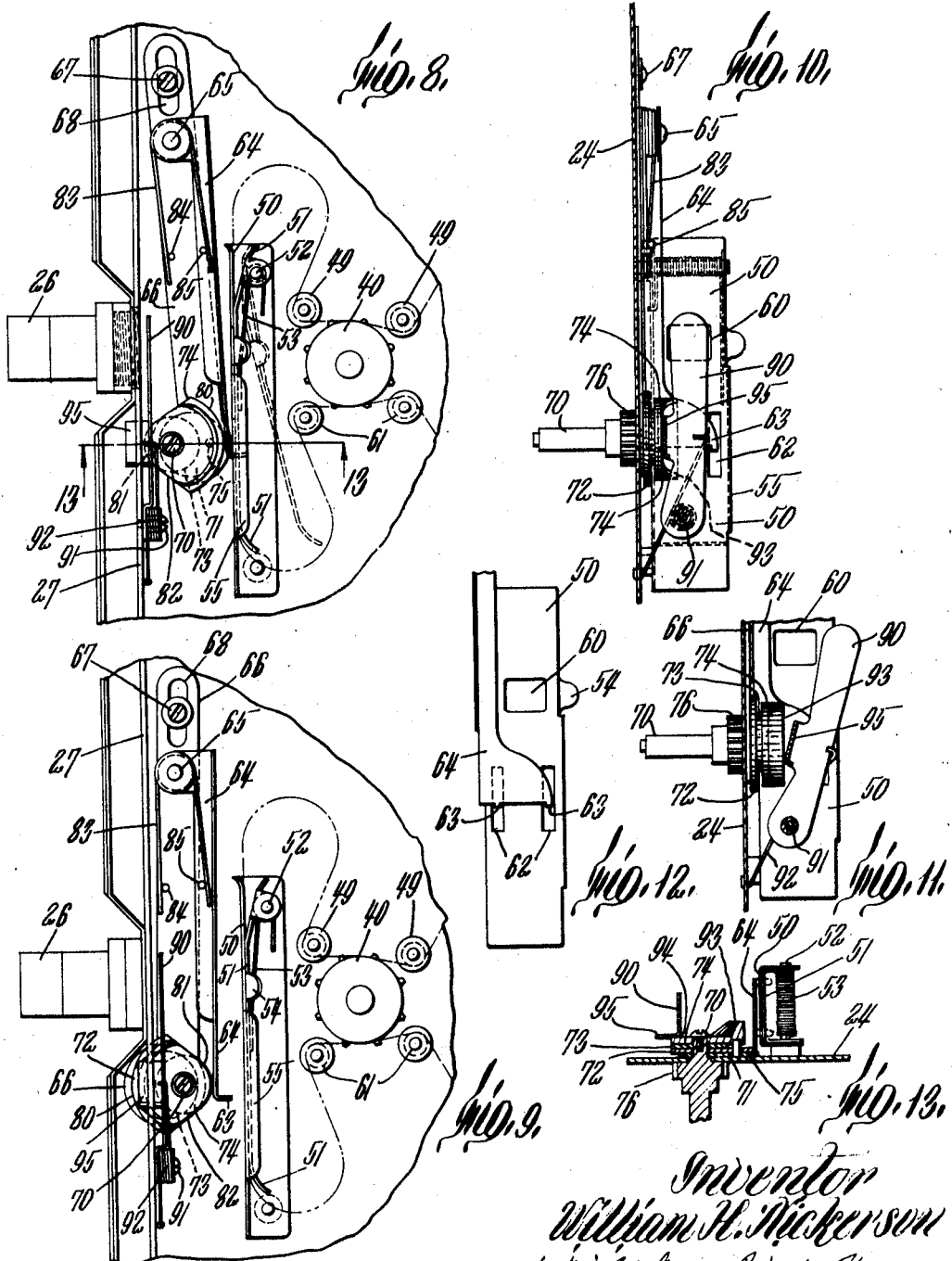

Patented May 23, 1933

1,911,034

UNITED STATES PATENT OFFICE

WILLIAM H. NICKERSON, OF NEWTON, MASSACHUSETTS

MOTION PICTURE CAMERA

Application filed July 11, 1930. Serial No. 467,269.

This invention relates to motion picture cameras, and more particularly to the portable type of camera which is intended to be held by the operator when in use.

It is an object of the invention to provide a motion picture camera which is easy to hold steady and to control. It is a further object of the invention to improve the operating mechanism of the camera so as to coordinate the movements of the shutter and film by a simple and efficient mechanism which can be constructed cheaply, thereby making it possible to produce an efficient camera at a comparatively low cost.

For a more complete understanding of the invention, reference is had to the description thereof which follows and to the illustration thereof on the drawings, of which,—

Figure 1 is a side elevation of a camera embodying the invention.

Figure 2 is a front elevation of the same.

Figure 3 is an elevation of the opposite side of the same.

Figure 4 is a section on the line 4—4 of Figure 5.

Figure 5 is a section on the line 5—5 of Figure 4.

Figure 6 is a section on the line 6—6 of Figure 5.

Figure 7 is a section on the line 6—6 of Figure 6.

Figure 8 is an elevation of the working parts shown in Figure 4, these parts being shown on a larger scale.

Figure 9 is similar to Figure 8 except that the parts are shown in a different position of operation.

Figure 10 is an end elevation of some of the mechanism illustrated in Figure 8.

Figure 11 shows a portion of Figure 10 with the parts in a different position of operation, corresponding to Figure 9.

Figure 12 is an elevation of a portion of the apparatus for exposing and feeding the film.

Figure 13 is a section on the line 13—13 of Figure 8.

Referring to the drawings in detail, the camera illustrated thereon may comprise a suitable case or housing of two parts 20 and 21. Although the camera is usually held in an upright position as illustrated in Figure 2, when in use, the part 20 is hereinafter referred to as the bottom portion of the casing, the part 21 being referred to as the top portion of the casing, this being consistent with the position of the camera when laid down for the purpose of exchanging reels of film. The camera may be provided with the customary lens 22 and a finder 23. As shown, the finder is located within the bottom portion 20 of the housing and consists of the usual combination of two lenses mounted at opposite ends of a tube extending completely through the casing. Within the bottom member 20 is mounted a mechanism for operating the film and shutter. To facilitate the location of the various parts, a plate 24 is mounted within the camera, this plate being parallel to the side walls of the camera, and secured to the bottom member 20 as by suitable pillars 25. Substantially all the mechanism in the camera is mounted directly on the plate 24 so that by removing the plate from the camera, the working parts are supported conveniently accessible for repairs or adjustments. In order to ensure the correct spacing between the lens and film, the lens holder 26 is also secured directly to the plate 24. To this end the plate is provided with a wide flange 27 along its front edge. The lens holder 26 is inserted through an aperture in the front face of the camera casing and is screwed into a threaded aperture in the flange 27. This feature of construction also stiffens and strengthens the connection between the plate 24 and the casing.

The driving mechanism is located below the plate 24 and is illustrated in Figure 6. This portion of the mechanism may comprise a main spring 30, the outer end of which is connected to a ratchet wheel 31 engaged by a suitable pawl 32. The ratchet 31 may be mounted in a shallow cylindrical housing 33 which, as shown in Figure 2, may project from the bottom of the casing member 20. The housing 33 is preferably provided with a knurled peripheral surface so that it may be readily grasped and turned in order to wind up the spring 30. The inner end of the spring 30 may be secured to a central shaft 34 on which is mounted a gear wheel 35 which meshes with a pinion 36 mounted on a shaft 37. This shaft also carries a pulley 38 and a spiked wheel 40, the latter serving to feed the film from a supply reel 41 to a take-up reel 42. The supply reel is loosely mounted on a stud 43 which projects from the plate 24. The take-up reel is splined to a shaft 44 on which is also mounted a gear 45 which meshes with a gear 46 mounted with a pulley 47, the latter being driven from the pulley 38 as by a flexible belt 48. This belt may be in the form of a light wire spring helix which is adapted to allow an easy slippage between the drive shaft 37 and the reel shaft 44.

As shown in Figure 4, the film F leads from the supply reel 41 and is held with its perforated edge or edges meshing with the spikes on the feed wheel 40 by a pair of guide rollers 49. From these rollers the film extends in a loop to a plate 50 against which it is held flat by a spring-pressed plate 51, the latter being pivotally mounted as at 52 and pressed by a spring 53. An ear 54 projects from the upper edge of the plate 51 and serves as a finger piece to facilitate the swinging back of the plate 51 from the plate 50 so that the film can be threaded between the plates. The plate 50 may be provided with a lateral guide flange 55 to facilitate the proper location of the stretch of film when the latter is inserted. As shown in Figure 12, the plate 50 is provided with a suitable rectangular opening 60 with which a portion of the film is adapted to register each time an exposure is made. The exposed film leaves the plate 50 near its lower end and extends in a loop to a pair of successive guide rollers 61 by which it is held against the feed wheel 40 so that the prongs of the latter engage the marginal perforations in the film. From the guide rollers 61 the film extends to the take-up reel 42. Since the portion of the film which is exposed must be stationary during the period of exposure, it is necessary to provide for an intermittent feed for the portion of the film passing the aperture 60.

To this end the plates 50 and 51 are each provided with a pair of slots 62 to receive a pair of claws or prongs 63 on a feeding arm 64. The prongs 63 are adapted to enter marginal perforations in the film and to control the feeding motion of the stretch of film between the plates 50 and 51. Mechanism by which such feeding motion is produced is illustrated in Figures 8 to 13. The feeding arm 64 is pivotally mounted as at 65 on a pitman 66 which, as illustrated, may consist of an elongated plate. The upper end of the pitman 66 is guided in its motion by a pin 67 which is secured to the wall of the housing 20, and which rides in a slot 68 in the pitman 66. At the opposite end of the pitman 66 is an eccentric strap which rides on an eccentric to reciprocate the pitman. The eccentric, as shown, is a portion of a rotatable member mounted on a shaft 70. This rotatable member may be formed in a single piece, but, as hereinafter described and illustrated on the drawings, it is composed of five pieces, namely, the eccentric 71, an edge cam member 72, a spacing washer 73, a face cam member 74, and a pin 75. The pin serves to retain the cam members and eccentric is fixed angular relation to one another. The shaft 70 carries a pinion 76 which is driven by a gear 77 mounted on the shaft 37. As the shaft 70 rotates the eccentric 71 and reciprocates the pitman 66 and the feeding arm 64 which is carried by the pitman 66, this tends to impart to the prongs 63 a sweeping motion to feed the film past the aperture 60, this motion consisting of an in and out motion of the prongs and a reciprocating motion approximately parallel to the plate 50. The mounting of the prongs 63 on the arm 64 rather than directly on the pitman permits a modification of the motion of the prongs whereby the prongs enter the slots 62 before the reciprocating motion in one direction is begun and remain in the slots 62 until the conclusion of the film-feeding stroke. This modification of the motion of the prongs is caused by the edge cam member 72 which is arranged to engage the arm 64 at a point adjacent to the prongs 63, as illustrated in Figure 13. The shape of this edge cam is shown in Figures 8 and 9 and includes two arcs 80 and 81 concentric with the shaft 70, the radius of the arc 80 being considerably greater than the radius of the arc 81. These arcuate edges may be connected by straight edges 82. The greater radius of the arc 80 causes the cam to hold the prongs 63 in the slots 62 as long as the arcuate edge 80 is in contact with the arm 64. When the arm 64 is in contact with the edge portion 81 of the cam, the prongs 63 are clear of the slots 62 and of the film between the plates 50 and 51. The arm 64 is pressed into continual contact with the cam member 72 as by a spring 83, the ends of which press respectively against a pin 84 on the pitman and a pin 85 on the arm 64. As the cam members and the eccentric rotate about the axis of the shaft 70, the cam member 72 pushes the prongs 73 through the slots 62 before the reciprocating motion of the prongs is begun, and permits the withdrawal of the prongs from the slots 62 by the spring 83 only after the reciprocating stroke is completed. The return stroke of the prongs 63 is then made when the prongs are clear of the slots 62, as illustrated in Figure 9. During this return stroke of the prongs, the film is held stationary by frictional engagement between the plates 50 and 51, and during this interval the exposure of the portion of the film registering with the opening 60 is made.

To this end the shutter is moved from between the lens and film and then back to cover the lens, both movements taking place during this interval of rest in the motion of the film. As shown, the shutter may consist of a flat arm 90, an end portion of which normally extends across the inner end of the lens holder to cover the lens aperture. The arm 90 may be hinged near its opposite end as at 91 and may be pressed by a spring 92 toward its normal closed position. From its closed position, it may be swung to uncover the lens aperture as by a face cam on the member 74. This member has a high portion 93 and a low portion 94 on which rides an ear or cam follower 95 carried by the arm 90. The sloping cam surfaces connecting the high and low portions are preferably made as steep as possible consistent with the normal speed of operation of the mechanism so that the period of opening and closing motions of the shutter is negligible in comparison with the period of each exposure. When the ear 95 rides on the low portion of the face cam, the shutter is closed as shown in Figure 10. When the ear 95 rides on the high portion 93 of the face cam, the shutter is swung open as shown in Figure 11. Since the cam member 74 and the cam member 72 are both mounted on a common shaft 70, the motion of the shutter is thus synchronized with the feeding motion of the prongs 63, so that after the prongs 63 are withdrawn from the slots 62 the ear 95 rides up on the elevated portion 93 of the face cam, as shown in Figure 9, to open the shutter. The shutter remains open during the return stroke of the prongs 63, but closes before the prongs are inserted again into the slots 62 to feed the film another hitch.

The speed of the mechanism is maintained substantially constant as by a governor 100. This governor may comprise a pair of weights 101 pivotally mounted on pins 102 which are carried by a disk mounted on a shaft 103. The free end of each of the weights 101 is joined as by a spring 104 to the adjacent pin 102 of the other weight, so that the weights are resiliently drawn away from the cylindrical housing 105 of the governor. Rotation of the governor causes the weights 101 to swing outwardly into frictional contact with the housing 105, thus creating a frictional drag which is proportional to the speed of rotation of the governor. The governor is driven as by a pinion 106 mounted on the shaft 103 and meshing with the gear 77.

To start and stop the apparatus, a finger button 110 may be mounted to project from the camera housing 20. This button has a shank portion 111 within the housing, the end of which engages a lever 112. An end of the lever 112 is bent over as at 113 into the path of a series of pins 114 which are mounted on the gear wheel 77. The pins 114 are so located as to stop the camera action with the shutter 90 in its closed position. Since the shutter action is driven through the pinion 76 which meshes with the gear 77, the pins 114 are located to stop the gear 76, and hence the cam 74, in a definite angular position wherein the ear 95 of the shutter rests on the low portion 94 of the face cam 72. The lever 112 is pivotally mounted as at 115 between the bent end 113 and the point of engagement with the shank 111. A suitable spring 116 may be provided to hold the end portion 113 normally in the path of the pins 114. Pressure on the button 110 rocks the lever 112 against the spring 116 to move the end 113 out of the path of the pins 114, thus permitting all the mechanism driven by the spring 30 to operate. Upon releasing the button 110, the lever 112 resumes its normal position and catches the nearest pin 114 to stop the mechanism. As shown in Figure 1, the starting button 110 is conveniently placed so as to be engageable by a finger of the operator, the spring housing 33 serving as a steadying support for the camera by resting in the heel of the operator's hand. In order to keep track of the amount of film which has been used, a feeler 120 may be provided, this feeler being pivotally mounted as on a shaft 121 which also carries a gear sector 122 in mesh with a pinion 123 carrying an index 124 located outside of the camera housing.

I claim:

1. In a motion picture camera, a casing including an inwardly offset portion having a perforation, a support member removably mounted within said casing, said member including a portion abutting said offset casing portion and having a threaded perforation registering with the perforation in said casing, a lens holder having a reduced portion extending through the first said perforation, and threaded into said threaded perforation, whereby said abutting casing and member portions are clamped together in face to face contact.

2. In a motion picture camera, a casing having an inwardly offset portion with a perforation therethrough, a plate within said casing, a flange along one edge of said plate and integral therewith, said flange having a portion abutting said offset casing portion and having a threaded perforation therethrough arranged to register with said perforation in the casing, a lens holder having a reduced portion extending through said perforations and in threaded engagement with the inner perforation, and film feeding mechanism carried solely by said plate.

3. In a motion picture camera, film-feeding mechanism comprising an eccentric and strap, a lever arm pivotally mounted on said strap for reciprocation therewith, a film-engaging prong carried by said lever arm, means including a cam bearing against said lever arm for moving said prong into engagement with said film and a spring mounted on said strap and bearing against said lever arm for moving said prongs out of engagement with said film, a shutter, a cam bearing directly against said shutter for the actuation thereof, and a common shaft carrying said eccentric and cams.

4. In a motion picture camera, film-feeding mechanism comprising an eccentric and strap, a lever arm pivotally mounted on said strap for reciprocation therewith, a film-engaging prong carried by said lever arm, means including a cam bearing against said lever arm for moving said prong into engagement with a film and a spring mounted on said strap and bearing against said lever arm for moving said arm and said prongs out of engagement with said film, a shutter, a cam for actuating said shutter, and a common shaft carrying said eccentric and cam.

5. In a motion picture camera having a lens aperture, a one-piece shutter pivoted near one end and having a portion adjacent to the other end movable edgewise about said pivot to uncover and cover said lens aperture, a rotatable shaft, a cam mounted on said shaft and having a face-cam surface bearing against said shutter for rapid periodic actuation thereof, an eccentric mounted on said shaft, a strap on said eccentric, an arm pivoted on said strap and reciprocable therewith in the direction of film feed, and a cam mounted on said shaft and an opposing spring engaging said arm for in and out motion relative to a film.

In testimony whereof I have affixed my signature.

WILLIAM H. NICKERSON.